Oct. 20, 1959  S. S. KOZUB  2,909,233
DRIVE ASSEMBLY FOR AUTOMOBILES
Filed Sept. 19, 1957  2 Sheets-Sheet 1
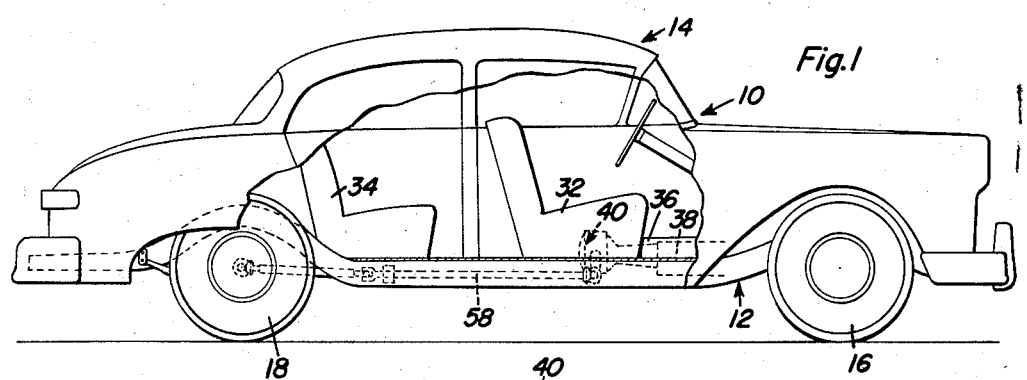
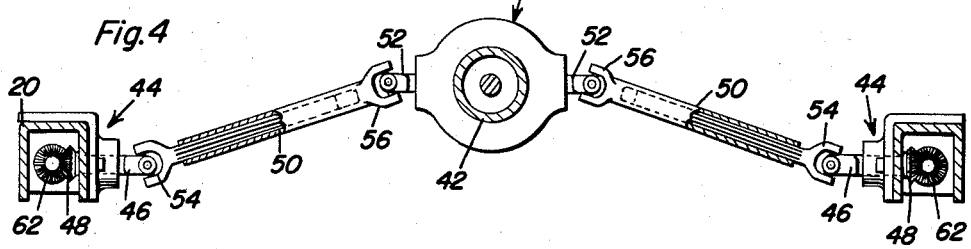
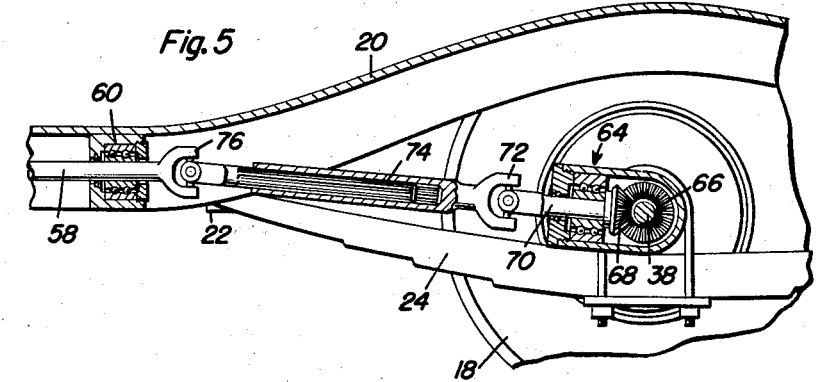
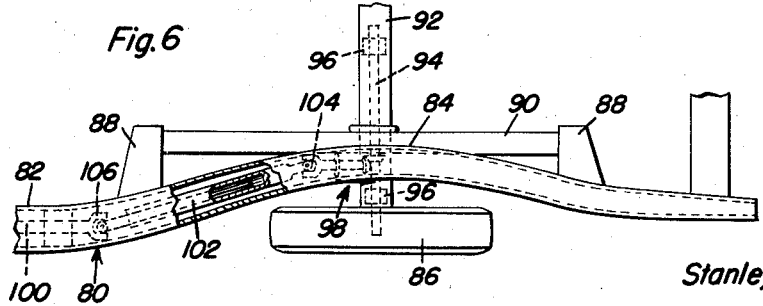
Stanley S. Kozub
INVENTOR.

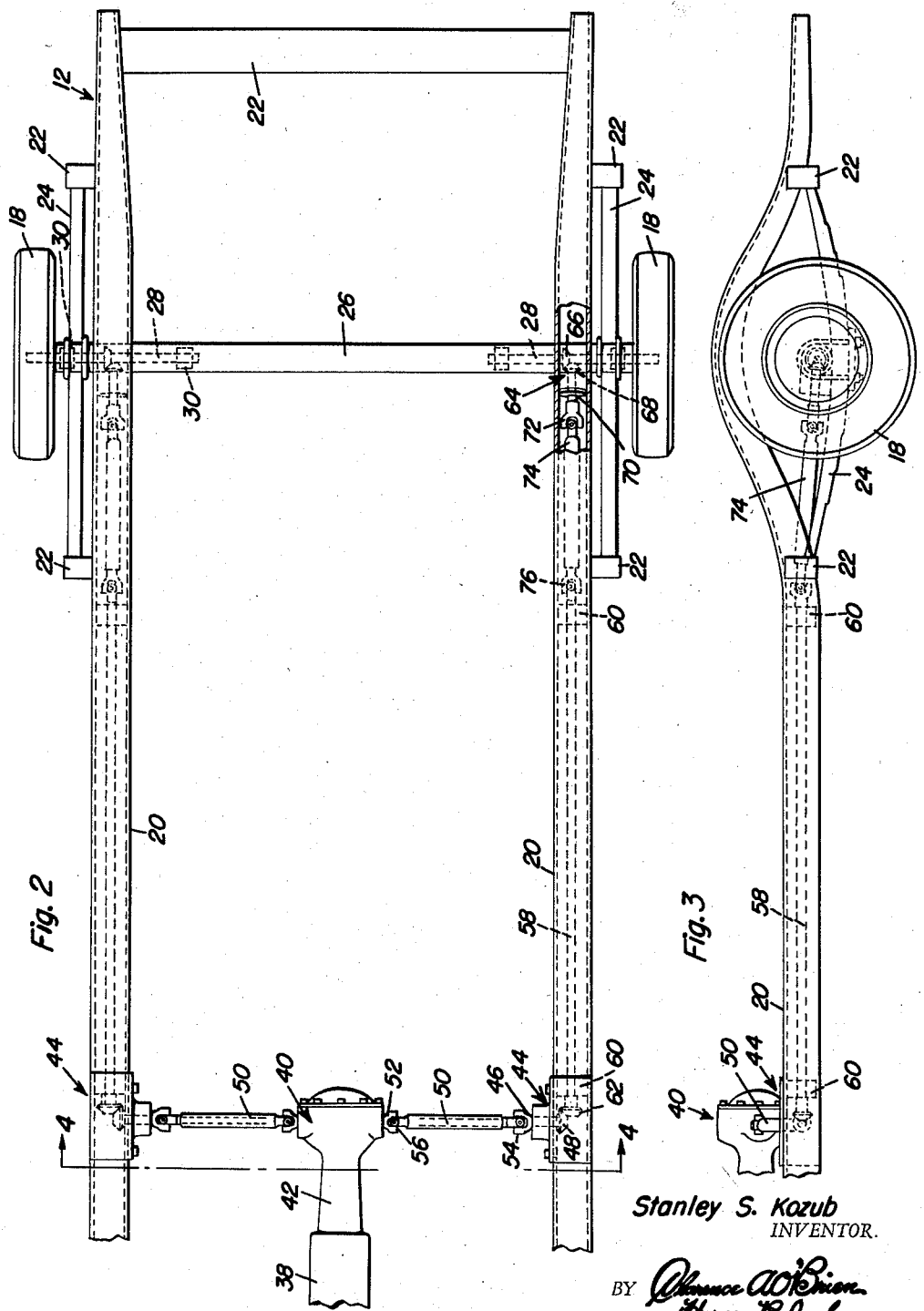

United States Patent Office 2,909,233
Patented Oct. 20, 1959

2,909,233
DRIVE ASSEMBLY FOR AUTOMOBILES
Stanley S. Kozub, Geneva, Ohio
Application September 19, 1957, Serial No. 685,029
5 Claims. (Cl. 180—73)

This invention relates in general to new and useful improvements in automobile construction and more specifically to an improved drive assembly for automobiles.

In order to provide proper ground clearance for the oil pan of an automobile, the engine must be elevated with the result that the axis of the crank shaft of the engine is a considerable distance above the ground. Also, in order that the normal differential of an automobile may have proper ground clearance, the axis of the differential is a considerable distance above the ground. Further, since it is normally desirable to align the axes of the engine crank shaft and the differential, the transmission and drive shaft of the automobile are disposed in a straight line. Until recently this has not posed a problem. However, recently the trend of automotive design has been to lower the vehicle as close as possible to the ground. With the result, it has been necessary to build into the floor of the vehicle body relatively deep channels or tunnels. These tunnels remain necessary in the front part of the vehicle because of the position of the transmission. However, the tunnels in the rear part of the vehicle are required only because of the fact that the drive shaft is so positioned where it is. Such a tunnel is very inconveniently placed and it not only makes it difficult to move about in the rear seat of a vehicle, but also restricts the leg room unduly.

It is therefore the primary object of this invention to provide an improved drive assembly for automobiles, the drive assembly being of such a nature whereby the center drive shaft and the necessity of a clearance tunnel therefor are completely eliminated.

Another object of this invention is to provide an improved drive assembly for automobiles, the drive assembly being so constructed whereby the drive shaft for the rear wheels is replaced by two individual drive shafts, there being one drive shaft for each wheel and the drive shaft being mounted within the hollow frame rails of the vehicle.

A further object of this invention is to provide an improved drive assembly for automobiles, the drive assembly including a differential which is placed immediately rearwardly of the transmission and under the front seat of the vehicle, the drive assembly also including transverse shafts connected to the differential and extending outwardly therefrom, there being connected to the transverse shaft longitudinal drive shafts which are disposed within the hollow frame rails of the frame of the vehicle and which are independently connected to rear axles carried by a rear axle housing, the assembly being of such a nature whereby it may be easily modified to compensate for either straight frame rails or those which bow inwardly in the vicinity of the rear wheels as is the case in some modern vehicles.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a sedan type vehicle incorporating the drive assembly which is the subject of this invention, portions of the vehicle being broken away and shown in section;

Figure 2 is an enlarged fragmentary plan view of the frame of the vehicle of Figure 1 and shows the details of the drive assembly which is the subject of this invention;

Figure 3 is an enlarged fragmentary side elevational view of the frame and drive assembly of Figure 2;

Figure 4 is an enlarged fragmentary sectional view taken substantially upon the plane indicated by the section line 4—4 of Figure 2 and shows the details of the drive assembly in the vicinity of the differential;

Figure 5 is an enlarged fragmentary longitudinal sectional view showing the details of the drive assembly in the vicinity of the rear axle housing; and Figure 6 is a fragmentary top plan view of a modified form of frame and drive assembly.

Referring now to the drawings in detail, it will be seen that there is illustrated in Figure 1 a sedan type vehicle 10 which incorporates the drive assembly which is the subject of this invention. The vehicle 10 includes a frame which is referred to in general by the reference numeral 12, there being mounted on the frame 12 a body 14. The frame 12 is supported by a pair of front wheels and a pair of rear wheels 18.

Referring now to Figure 2 in particular, it will be seen that the frame 12 is of a conventional construction and includes a pair of hollow longitudinal frame rails 20. The frame rails 20 are suitably connected together by a rear transverse frame member 22. Other frame members will, of course, be provided.

Each of the frame rails 20 is provided with a pair of longitudinally spaced spring hangers 22 between which there extends a rear spring 24. The rear spring 24 in turn has coupled thereto a rear axle housing 26. The rear axle housing 26 has extending from opposite ends thereof independent rear axles 28 which are suitably journaled in bearings 30 carried by the rear axle housing 26. Secured to each of the axles 26 for rotation therewith is one of the rear wheels 18.

The vehicle 10 includes a front seat 32 and a rear seat 34. Disposed forwardly of the front seat 32 within a tunnel 36 formed in the floor of the body 14 is a conventional type of transmission 38.

Disposed rearwardly of the transmission 38 beneath the front seat 32 is a differential 40. The differential 40 will have an internal construction which will be identical with the internal construction of existing rear differentials. The differential 40 includes a housing 42 which is suitably connected to the transmission 38. The differential 40 and the transmission 38 will, of course, be rigidly mounted with respect to the frame 12 in any conventional manner.

Carried by each of the frame rails 20 in alignment with the differential 40 is a built-in gear box 44. Each of the gear boxes 44 includes a transversely extending stub shaft 46 which has mounted thereon a drive gear 48. The stub shaft 46 of each gear box 44 has connected thereto a drive shaft 50 by means of a universal joint 54. The differential 40 has extending from opposite sides thereof stub shafts 52 which are connected to each transverse drive shaft 50 by means of a universal 56. It is also to be understood that mounted within the housing 42 is a short shaft which connects the differential 40 to the transmission 38.

Positioned in each of the frame rails 20 is a forward section 58 of an elongated drive shaft. The forward section 58 is suitably journaled in bearings 60 carried by the frame rail 20 in which it is mounted and it is provided at the forward end thereof with a gear 62 which is meshed with the gear 48.

Each end of the rear axle housing 26 is provided with a gear box which is referred to in general by the reference numeral 64. The gear box 64 has extending therethrough one of the rear axles 28. The rear axle 28 is provided intermediate the ends thereof with a drive gear 66 which has meshed therewith a drive gear 68. The drive gear 68 is carried a stub shaft 70 of the gear box 64.

Connected to the stub shaft 70 by means of a universal 72 is a rear drive shaft section 74. The forward end of the rear drive shaft section 74 is connected to the rear end of the drive shaft section 58 by a universal 76.

From the foregoing description of the drive assembly of the vehicle 10, it will be seen that the differential 40 and the gear boxes 44, as well as the transverse shafts 50 are positioned under the front seat 32 of the vehicle 10. Thus the space required for these components may be covered by any conventional hump or tunnel in the floorboard of the body 14 and will be in an out-of-the-way position, the hump or tunnel being covered by the front seat 32. Since the remainder of the drive shaft sections are disposed within the frame rails 20, the necessity for a rear tunnel is completely eliminated. This greatly increases the floor space in the rear part of the vehicle body 14. Inasmuch as the differential 40 is provided, the drive action of the rear wheels 18 will remain the same.

In some instances the frames are much wider than others. A typical wide frame construction is illustrated in Figure 6, the frame being referred to in general by the reference numeral 80. The frame 80 is formed of a pair of longitudinal frame rails 82, only one being shown. The rear portion of each frame rail 82 is inwardly bowed as at 84 to provide clearance for a rear wheel 86. Spring hangers 88 extend inwardly from the frame rail 82 and have extending therebetween a rear spring 90 which supports the frame 80 from a rear axle housing 92.

The rear axle housing 92, like the rear axle housing 26 has mounted therein for rotation an individual rear axle 94. The rear axle 94 is suitably journaled in bearings 96 carried by the rear axle housing 92. The wheel 86 is drivingly connected to the rear axle 94.

Carried by the outer end portion of the rear axle housing 92 at each end thereof is a gear box 98. The gear box 98 is identical with the gear box 64 and a further description thereof is believed to be unnecessary. Connecting the gear box 98 to a forward drive shaft section 100 which corresponds to the drive shaft section 58 is a rear drive shaft section 102. The rear drive shaft section 102 compensates for the offset of the gear box 98 with respect to the forward drive shaft section 102. The rear drive shaft section 102 is connected to the gear box 98 by a universal 104 and to the forward drive shaft section 100 by a universal 106.

It is to be understood that all other components of the drive system for those portions shown in Figure 6 will be identical with those illustrated in Figure 2. Accordingly, further description of these components is not believed to be necessary.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a vehicle construction including a frame having spaced hollow rails, a drive system, said drive system comprising a transmission, a rear axle housing, spring means mounting said frame on said rear axle housing, individual rear axles carried by said rear axle housing for independent rotation, rear wheels secured to said rear axles in driven relation, a differential disposed intermediate said transmission and said rear axle housing and fixedly mounted on said frame, a short drive shaft connecting said differential to said transmission, transverse drive shafts extending outwardly from opposite sides of said differential, elongated drive shafts disposed in said frame rails, first drive means drivingly connecting said elongated drive shafts to said transverse drive shafts, and second drive means drivingly connecting said rear axles to said elongated drive shafts.

2. In a vehicle construction including a frame having spaced hollow rails, a drive system, said drive system comprising a transmission, a rear axle housing, spring means mounting said frame on said rear axle housing, individual rear axles carried by said rear axle housing for independent rotation, rear wheels secured to said rear axles in driven relation, a differential disposed intermediate said transmission and said rear axle housing and fixedly mounted on said frame, a short drive shaft connecting said differential to said transmission, transverse drive shafts extending outwardly from opposite sides of said differential, elongated drive shafts disposed in said frame rails, first drive means drivingly connecting said elongated drive shafts to said transverse drive shafts, and second drive means drivingly connecting said rear axles to said elongated drive shafts, said first drive means including gear boxes built into said frame rails.

3. In a vehicle construction including a frame having spaced hollow rails, a drive system, said drive system comprising a transmission, a rear axle housing, spring means mounting said frame on said rear axle housing, individual rear axles carried by said rear axle housing for independent rotation, rear wheels secured to said rear axles in driven relation, a differential disposed intermediate said transmission and said rear axle housing and fixedly mounted on said frame, a short drive shaft connecting said differential to said transmission, transverse drive shafts extending outwardly from opposite sides of said differential, elongated drive shafts disposed in said frame rails, first drive means drivingly connecting said elongated drive shafts to said transverse drive shafts, and second drive means drivingly connecting said rear axles to said elongated drive shafts, said second drive means including individual gear boxes carried by said rear axle housing.

4. In a vehicle construction including a frame having spaced hollow rails, a drive system, said drive system comprising a transmisison, a rear axle housing, spring means mounting said frame on said rear axle housing, individual rear axles carried by said rear axle housing for independent rotation, rear wheels secured to said rear axles in driven relation, a differential disposed intermediate said transmission and said rear axle housing and fixedly mounted on said frame, a short drive shaft connecting said differential to said transmission, transverse drive shafts extending outwardly from opposite sides of said differential, elongated drive shafts disposed in said frame rails, first drive means drivingly connecting said elongated drive shafts to said transverse drive shafts, and second drive means drivingly connecting said rear axles to said elongated drive shafts, said first drive means including gear boxes built into said frame rails, said second drive means including individual gear boxes carried by said rear axle housing.

5. In a vehicle construction including a frame having spaced hollow frame rails, a drive system, said drive system comprising a transmission, a rear axle housing, spring means mounting said frame on said rear axle housing, individual rear axles carried by said rear axle housing for independent rotation, rear wheels secured to said rear axles in driven relation, a differential disposed intermediate said transmission and said rear axle housing and fixedly mounted on said frame, a short drive shaft connecting said differential to said transmission, transverse drive shafts extending outwardly from opposite sides of said differential, elongated drive shafts disposed in said frame rails, said frame rails being longitudinally curved in plan and said drive shaft corresponding generally in shape to the outline of said frame rails, first drive means drivingly connecting said elongated drive shaft to said transverse drive shafts, and second drive means drivingly connecting said rear axles to said elongated drive shafts, said first drive means including gear boxes built into said frame rails, and said second drive means including individual gear boxes carried by said rear axle housing.

References Cited in the file of this patent

UNITED STATES PATENTS

| | | |
|---|---|---|
| 1,156,852 | Van Sant | Oct. 12, 1915 |
| 1,242,682 | Goodrich | Oct. 9, 1917 |
| 1,502,089 | Daimler | July 22, 1924 |
| 1,989,837 | Walters | Feb. 5, 1935 |
| 2,002,402 | Konopka | May 21, 1935 |
| 2,308,351 | Blagden et al. | Jan. 12, 1943 |
| 2,477,252 | Hutchings | July 26, 1949 |
| 2,693,719 | Johnson | Nov. 9, 1954 |